J. CHRISTY.
VEHICLE TIRE.
APPLICATION FILED MAY 13, 1912.
1,067,307.
Patented July 15, 1913.
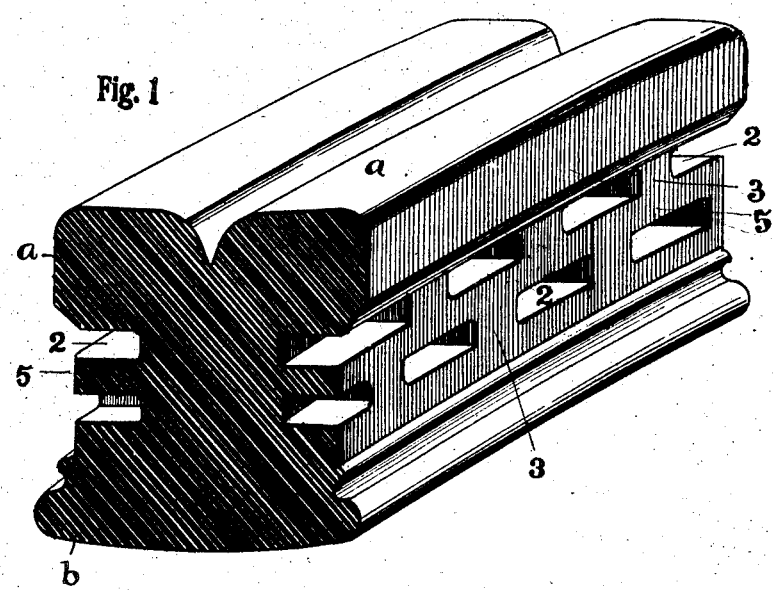
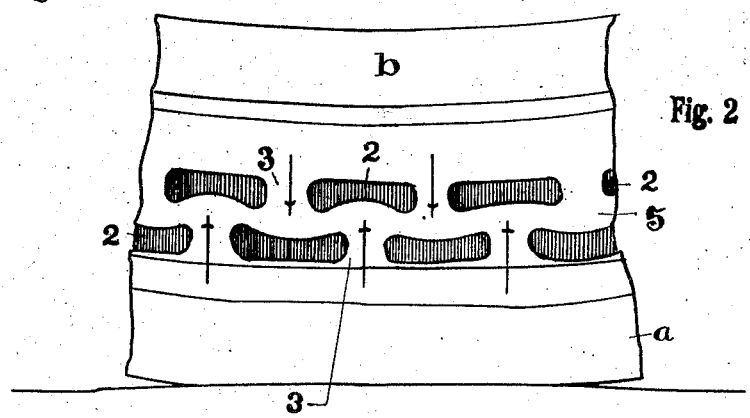
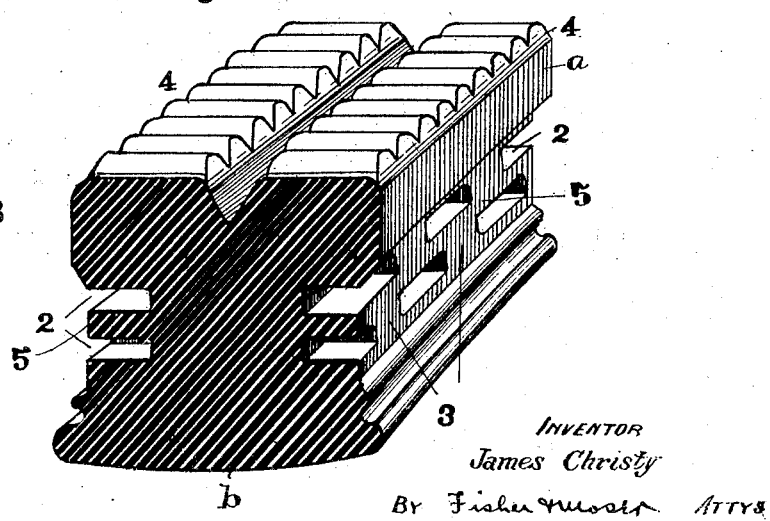
ATTEST
E. M. Fisher
F. J. Greer
INVENTOR
James Christy
By Fisher & Moser ATTYS

UNITED STATES PATENT OFFICE.

JAMES CHRISTY, OF AKRON, OHIO.

VEHICLE-TIRE.

1,067,307.  Specification of Letters Patent.  Patented July 15, 1913.

Application filed May 13, 1912. Serial No. 696,863.

*To all whom it may concern:*

Be it known that I, JAMES CHRISTY, citizen of the United States, residing at Akron, in the county of Summit and State of Ohio, have invented certain new and useful Improvements in Vehicle-Tires, of which the following is a specification.

This invention relates to resilient vehicle tires, and the invention consists in an improvement in what are commonly known as solid rubber tires, and in this instance in a tire of the double tread variety, all substantially as shown and described and particularly pointed out in the claim.

In the accompanying drawings, Figure 1 is a perspective view of a section of one form of tire embodying my invention, and Fig. 2 is a side elevation of a section of said tire shown as under a load. Fig. 3 is a perspective view of a section of a modification of the tire shown in Fig. 1.

As thus shown the invention is comprised in a tire made exclusively of rubber of a suitable consistency and quality to withstand the heavy wear for which it is intended, such as is sustained by trucks, traction engines and the like on city streets, and to this end the present tire is made with two or double treads *a*, which are spaced apart or separated in the periphery by a substantially V-shaped channel or groove while the sides of the tire have a substantially panel shape, the walls thereof being straight radially and the treads *a* overhanging said sides or extending laterally beyond the same somewhat in their outer portion. This construction alone is designed to contribute measurably to the resiliency of the tire, but the total resilient effect is obtained only by supplementing the said treads with recesses or cavities 2 formed in both sides of the tire substantially as shown. The said recesses are square or rectangular in outline but of greater length than width, and penetrate beneath said treads to greater or less distance as may be deemed best or say approximately one-fourth the total lateral depth of the tire and of the same size their full depth. The recesses also run in two rows or circles at each side and in staggered relation as between the rows, thereby leaving stock as indicated by 3 and which is sufficient in depth and strength to sustain such portion of the load as distributes itself in these directions. Obviously the construction of the tire with parallel treads spaced by a channel as shown so as to make each tire distinctive and in a measure independent of the other structurally will throw considerable portions of the load laterally over the said recesses, and here it is taken care of by the stock 3 which under a load will be compressed more or less and be accommodated by the shock absorbing recesses as seen, for example, in Fig. 2. Of course if the load were very heavy the said recesses might be much more nearly closed than this view shows but the cushion or resiliency which they afford would remain. It will also be seen that the stock or wall between the sides and ends of said recesses is uniform throughout the tire, and however viewed the same amount and form of the standing rubber is present with each recess, the rubber between the ends of recesses in the same series coming directly opposite the middle of one of the slots in the next series. Furthermore, and in addition to staggering the said recesses, they are shown as being overlapped at both ends approximately one-fourth their length by the recesses of the other series. This contributes most effectually to resilient action under the load and also absorbs a shock or impact that comes from obstructions in the road.

In Fig. 2 the tire is shown as having transverse ribs 4 on each tread adapted to prevent skidding, and to promote traction, but otherwise it is the same as Fig. 1, that is, it has the same staggered radial ribs 3 and intermediate annular wall 5.

It will be further noticed as a feature of construction that the depth of the material between slots is substantially equal to the radial depth of the recesses, which in any ordinary all rubber tire is about the right proportion. Of course, something will depend on the quantity of the stock used.

The base 6 of the tire is common to both treads, and may of course be reinforced with anchoring wires transfixed therein or even a tie in the channel between the treads if preferred. I might also make another series of recesses in each side of the tire but in that case either the recesses would have to be made of less radial depth or the depth of the tire increased.

In saying that the respective recesses on each side overlap at their ends it will of course be understood that a relative overlapping is meant as the wall 3 of the stock necessarily intervenes, and in a very real sense a honeycombed or cellular side wall is thus produced having sustaining walls between the cells very much like the walls in the honeycomb although the cells are oblong in elevation.

What I claim is:

A resilient tire with a solid rubber core and two treads about the same spaced apart by a relatively small substantially V-shaped channel and having recessed flat sides between the said treads and the base of the tire equal substantially to one-third the radial depth of the tire and said sides provided with two concentric series of substantially rectangular recesses penetrating to substantially midway the lateral depth of each tread; said recesses being spaced apart in each series by radial walls located opposite the middle of the recesses of the other series, and by a continuous division wall between said recesses substantially equal in thickness to the walls at the ends of said recesses, thereby providing shock absorbing means adapted to act with uniform effect on each side beneath the said treads in the riding movements of the tire in either direction.

In testimony whereof I affix my signature in the presence of two witnesses.

JAMES CHRISTY.

Witnesses:
 E. M. FISHER,
 H. T. FISHER.

Copies of this patent may be obtained for five cents each, by addressing the "Commissioner of Patents, Washington, D. C."